Patented Dec. 19, 1922.

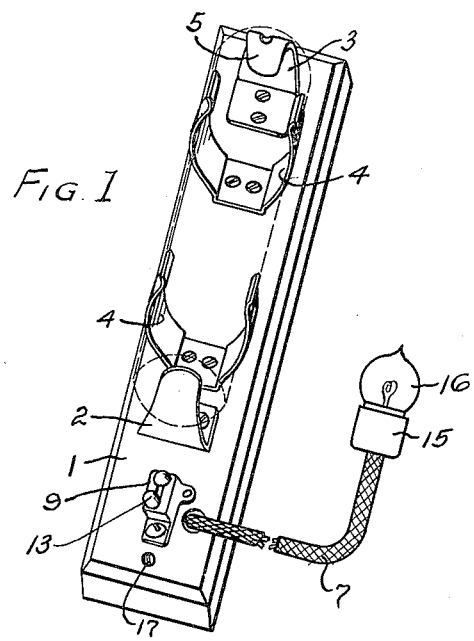
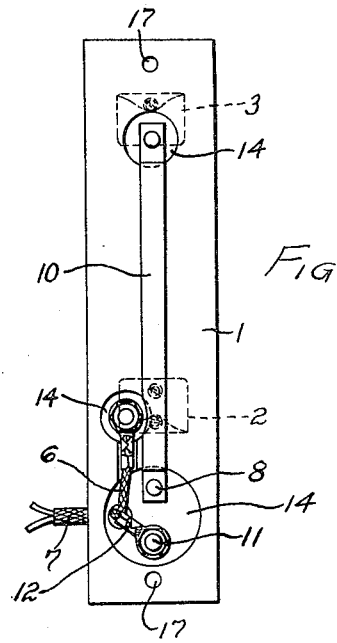
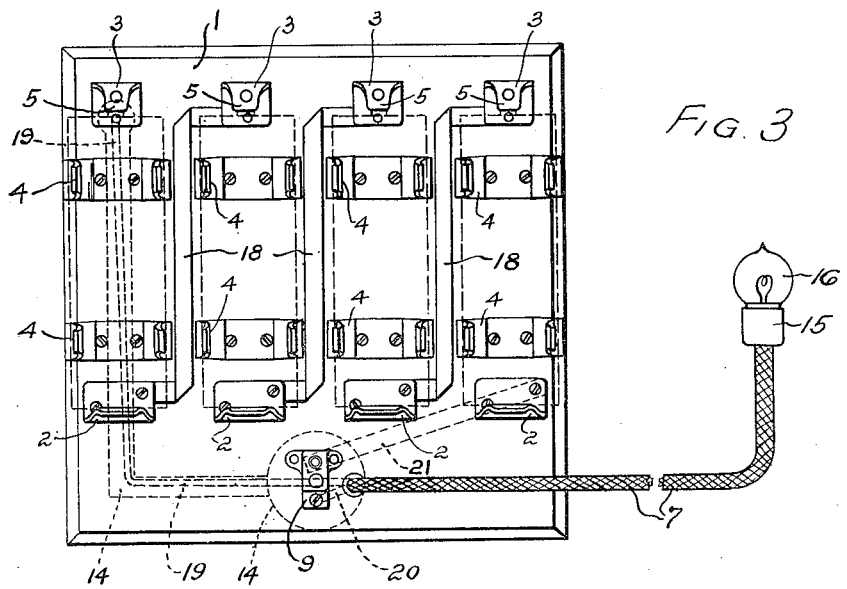

1,439,429

UNITED STATES PATENT OFFICE.

ANKER S. LYHNE, OF BRIDGEPORT, CONNECTICUT.

BATTERY HOLDER.

Application filed February 12, 1921. Serial No. 444,593.

*To all whom it may concern:*

Be it known that I, ANKER S. LYHNE, a citizen of the United States, residing at Bridgeport, county of Fairfield, State of Connecticut, have invented an Improvement in Battery Holders, of which the following is a specification.

This invention relates to battery holders and more particularly to holders for dry cells or ordinary flashlight batteries when using the same as a source of current for illuminating garages and basements, and similar places. It is frequently desirable when using current for such purposes to employ more than one cell, and as the cells wear out from time to time convenient means should be afforded for replacing them individually. In carrying out this invention I have devised a form of battery holder whereby any number of cells may be utilized for producing current and may be connected either in series or in parallel the cells being conveniently replaceable, and which is simple and inexpensive to make and safe in operation.

With this and other purposes in view I have devised the apparatus described in the following specification and illustrated in the accompanying drawing, in which—

Figure 1 is a perspective view of a holder for a single battery;

Figure 2 is a rear view of the holder shown in Figure 1, and

Figure 3 is a front elevation of a holder adapted to a plurality of batteries.

1 denotes a panel board which may be of wood or other suitable non-conducting material. Secured to 1 is a bracket 2 which carries the weight of the battery and above bracket 2 is an inverted bracket 3 engaging the opposite end of the battery. Between brackets 2 and 3 and secured to panel board 1, are spring clips 4 for engaging the sides of the battery.

In the ordinary battery of commerce the zinc shell constitutes one of the poles and a central terminal at one end constitutes the other pole of the battery. Brackets 2 and 3 are preferably made of metal, and constitute the means of establishing electrical contact with the battery as well as mechanically supporting it, the former contacting with the shell and the latter with the central pole. Bracket 3 is made of spring steel, or like material, and is bent over as at 5 to constitute a spring, so that the battery is resiliently held between brackets 2 and 3, and any slight inequalities in its length is thus provided for. Bracket 2 is connected to one of the insulated wires 6 of an ordinary lamp cord 7. Bracket 3 is connected to terminal 8 of switch 9 through conducting strip 10, the opposite terminal 11 of switch 9 being connected to the other insulated wire 12 of lamp cord 7. Switch 9 is provided with the usual sliding button 13 actuating a spring contact, although any suitable form of switch may be provided. The back of panel board 1 is countersunk as at 14 to provide space for the various connections. The end of lamp cord 7 is provided with a socket 15 carrying lamp 16. Holes 17 are provided for securing panel board 1 to the wall, although a hook (not shown) may be used if desirable.

In Figure 3 is shown a form of panel board in which four batteries are joined in series. Each of the batteries is retained in brackets 2 and 3 by spring clips 4, as in the foregoing description. Each bracket 2 is connected to bracket 3 of the right hand adjacent pair through conducting strips 18, left hand end bracket 3 being directly connected to one of the insulated wires 19 of lamp cord 7, and right hand end bracket 2 being connected to the other wire 20 of cord 7 through conducting strip 21 and switch 9, the latter being the same as described above.

While the system of connection here shown and described in Figure 3 constitutes a series connection, a connection in parallel may be readily made if desirable, by removing conducting strips 18 and connecting all four of terminals 3 together, and all four of terminals 2 together.

The device above set forth constitutes a portable extension lighting unit which may be temporarily secured to the wall, and capable of being readily removed to wherever needed, and which will function equally well in vertical or horizontal position.

What I claim is:

1. A battery holder comprising a panel board, a substantially rigid bracket secured thereto for engaging one end of and supporting a battery, spring clips independent of the bracket and secured to said panel board for engaging and clamping the sides of the battery, said bracket contacting with one pole of the battery, resilient means carried by said panel contacting with the free end of the other pole of the battery, and conducting means from said bracket and from said contacting means respectively for connection with the line circuit.

2. A battery holder comprising a panel board, a plurality of pairs of opposed brackets for engaging the ends of the batteries and contacting with the respective poles thereof, the brackets at the lower ends of the batteries being substantially rigid to support the weight of the batteries and the brackets at the tops being of resilient metal, spring clips between each pair of brackets and independent thereof for engaging and clamping the sides of the batteries, conducting means between the brackets, and conducting means from brackets of opposite polarity for connection with the line circuit.

3. A battery holder comprising a panel board, a plurality of pairs of opposed brackets for engaging the ends of the batteries and contacting with the respective poles thereof, the brackets at the lower ends of the batteries being substantially rigid to support the weight of the batteries and the brackets at the tops being of resilient metal and adapted to engage the free end of the pole of the respective battery, spring clips between each pair of brackets and independent thereof for engaging and clamping the sides of the batteries, conducting means between each bracket, excepting two opposite end brackets of different pairs, and an opposite bracket, and conducting means from said two poles and leading to the line circuit.

4. In combination with a battery and a line circuit, a battery holder comprising a panel board, opposed brackets secured thereto for engaging the battery ends and contacting with the respective poles thereof, the lower brackets being substantially rigid to support the weight of the batteries and the upper brackets being of resilient metal and adapted to yield longitudinally of the batteries, means for supporting the battery engaging the sides thereof, and conducting means between said brackets and said line circuit.

In testimony whereof I affix my signature.

ANKER S. LYHNE.